Nov. 7, 1950     C. R. ROCHE     2,528,711
ENGINE STARTER

Filed Sept. 30, 1946     3 Sheets—Sheet 1

INVENTOR.
CLIFTON R. ROCHE.
BY
Parker and Burton
ATTORNEYS.

Nov. 7, 1950   C. R. ROCHE   2,528,711
ENGINE STARTER
Filed Sept. 30, 1946   3 Sheets-Sheet 3

INVENTOR.
CLIFTON R. ROCHE.
BY
Parker and Burton
ATTORNEYS.

Patented Nov. 7, 1950

2,528,711

UNITED STATES PATENT OFFICE 2,528,711

ENGINE STARTER

Clifton R. Roche, Los Angeles, Calif.

Application September 30, 1946, Serial No. 700,217

15 Claims. (Cl. 123—185)

This invention relates to engine starters and particularly to a starter mechanism for aircraft.

An important object of this invention is to provide an improved starter mechanism for engines which is safe at all times, will not kick back or impose any unusual strain on the operator and which is operable from any position. A further object of the invention is to provide an improved starter mechanism which is light in weight, compact, and composed of parts which are easily and inexpensively manufactured and assembled.

An important object of the invention is to provide an improved starter mechanism for aircraft engines which is easily and conveniently operable by an occupant of the aircraft either when the aircraft is on the ground or in flight.

An important feature of this invention when used on aircraft is the novel provision whereby the pilot or other occupant of the aircraft can by manual means start the engine from the cockpit whether the aircraft is on the ground or in flight. Another important feature of the invention is the provision whereby the starter mechanism is immediately disconnected from the engine as soon as the engine commences to operate in normal manner or in the event reverse rotation of the engine occurs. This last provision is automatic and operable at any time during the starting operation. Another feature of the invention is the novel safety provision whereby once the starter has been disconnected from the engine it is necessary to allow the parts of the starter to return to their initial operating position before the starter can re-engage the engine.

Other novel features of the invention relate to a novel pawl assembly for engaging and disengaging the starter mechanism with the engine which includes a roller member carried by the assembly but movable relative thereto to control the action of the pawl. Associated with the pawl is novel means for providing a snap action at the time the pawl moves to engaging position to insure full engagement thereof. Another feature of the invention is the provision in the pawl assembly of roller retaining means which continuously exerts pressure upon the roller to engage a fixed peripheral surface yet permit limited travel of the roller relative to the pawl to vary the operating effectiveness of the latter. A further feature of the invention relates to the provision for preventing damage to the parts of the pawl assembly in the event a kick-back occurs during the starting operation.

Another object of the invention is to provide an improved force-multiplying means which functions to progressively increase the manual force exerted to start the engine. Flexible means in the form of a cable is employed to control the operation of the starter mechanism. The force-multiplying means is associated in a novel manner with the cable means to progressively increase the starting torque so that maximum force is applied at the time when maximum engine compression occurs.

Various other objects, advantages and meritorious features will become more fully apparent from the following specification, appended claims and accompanying drawings wherein:

Figures 1, 2, 11:
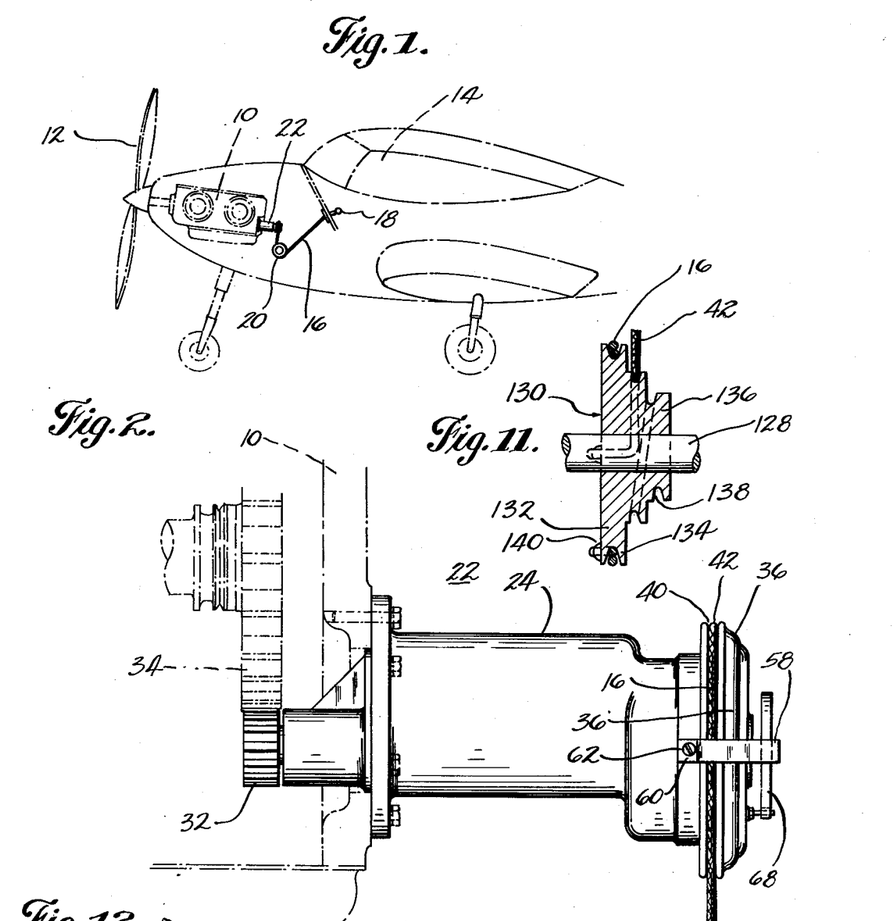
Figure 1 is a side elevation of a forward part of an aircraft illustrating schematically the general relation of the different positions of the parts of this invention when applied to an aircraft.
Figure 2 is a side elevation of a starter mechanism illustrating in dotted outline one form of mounting thereof upon an aircraft engine.
Figure 11 is a diametrical cross sectional view through the force-multiplying means in the manually operable cable control system of the starter.

In the illustrated embodiment of the invention a small light weight aircraft is illustrated in part in Figure 1, having installed therein motive power in the form of an internal combustion engine 10. A propeller 12 is driven by the engine in the conventional manner. The cockpit portion of the aircraft is indicated at 14 and extending thereinto is a flexible cable 16 having a handle 18 which may be grasped by the occupant and pulled rearwardly. This cable extends forwardly into the engine compartment and is coupled to a rotatable control device 20 which serves as a force-multiplying means. The cable 16 may then extend to the starter mechanism generally indicated at 22 for operating the same or function through the intermediary of a second cable section for this purpose as is described hereinafter.

Figures 3, 4, 10:
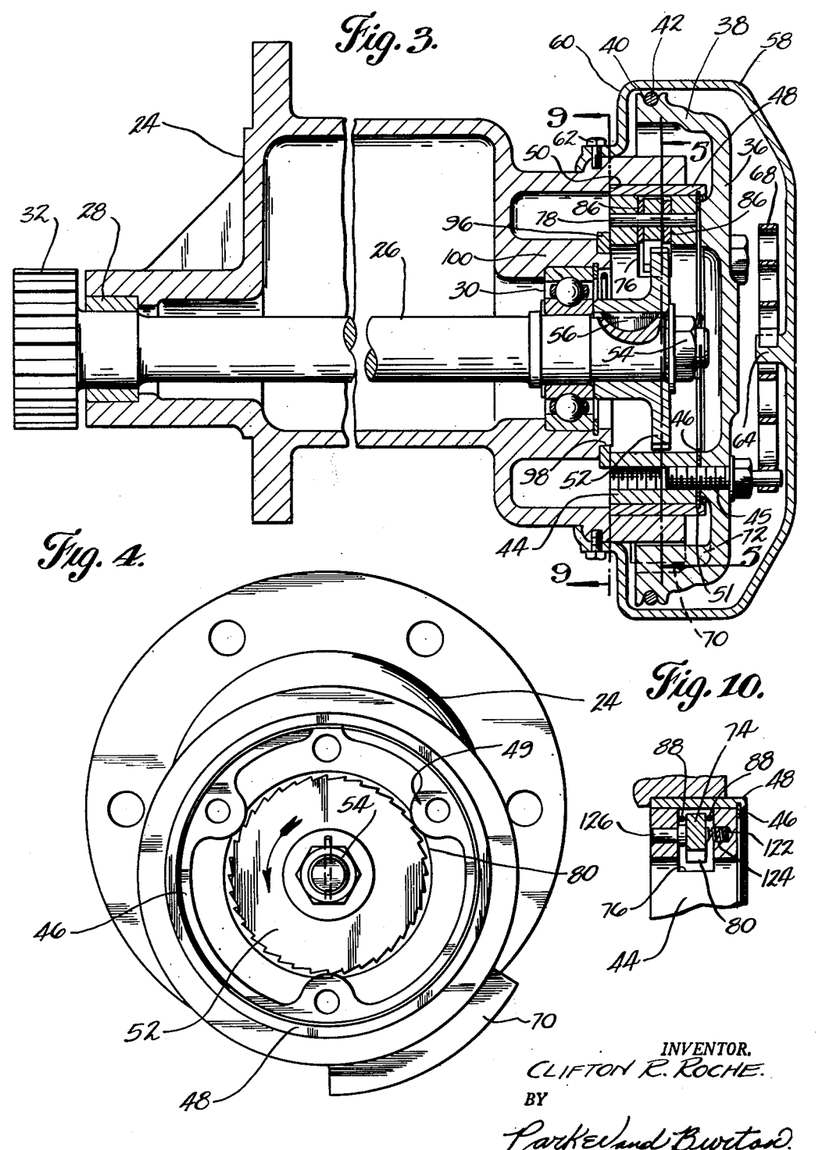
Figure 3, is a longitudinal sectional view through the starter mechanism of Fig. 2.
Figure 4 is a rear end view of the starter mechanism with the cable-controlled member thereof removed to show the interior arrangement.
Figure 10 is a detail sectional view along line 10—10 of Fig. 5 showing the means for frictionally retaining the pawl in adjusted position.

The engine starter 22 is shown in more detail in the remaining figures. Referring to Figs. 2 and 3, the starter comprises any suitable form of housing 24 bolted or otherwise secured to the engine. The starter may be mounted among the cluster of magneto assembly units of the engine similarly mounted on the rear end thereof, or it may be mounted at any other convenient operating position on the engine. Within the housing and extending longitudinally thereon is a rotatably driven shaft 26. A bearing 28 forms a journal mounting for the forward end of the shaft and a ball bearing assembly 30 forms a supporting journal for the rear end of the shaft. The forward projecting end of the shaft carries a pinion 32 meshing with a larger gear 34 which may be mounted on the crank shaft of the engine 10 or suitably coupled thereto.

Rotatably journaled on the rear end of the housing 24 and overlying the rear end opening thereto is a member or wheel 36 having a forwardly projecting peripheral portion 38 in which a circular groove 40 is formed. Received in this groove is the forward end portion of a cable section 42. The extremity of the cable may be fixed to the grooved periphery of the wheel in any suitable manner to prevent detachment therefrom when pulled by the occupant of the cockpit. Within the rear end of the housing 24 is an annular member or ring 44. This ring member is secured to the grooved wheel 36 for joint rotation therewith. This may be accomplished by the use of bolts 45, three of which are shown in the illustrated embodiment of the invention. A thin annular disc or snap ring type washer 46 is preferably interposed between the adjacent surfaces of the wheel 36 and the ring member 44 and as shown in Fig. 4 is provided with apertured ears 49 to admit the bolts 45. Concentrically encircling the ring 44 within the rear end of the housing is a sleeve member or circular band 48. The sleeve abuts the annular shoulder 50 of the housing and is preferably press-fitted into the housing so that it is held thereby against rotation. The radial dimensions of the inner periphery of the sleeve and the outer periphery of the ring member are such that the latter slidably contactually fits within the former and is free to rotate therein. The sleeve member 48 has an internal annular groove 51 into which the annular disc 46 is snapped. This annular groove has sufficient clearance to allow the annular disc to rotate freely and is located so as to hold the assembly of the grooved wheel, the annular ring, and annular disc, in position axially.

Fixed to the rear end of the driven shaft 26 beyond the ball bearing assembly 30 is a ratchet wheel 52. This wheel is slidably received over the rear end of the shaft and held in position by a retaining nut 54 which urges the wheel against the inner race of the ball bearing assembly. It is keyed to the shaft, as indicated by the key 56, for joint rotation therewith and as shown in Fig. 3 is positioned within the plane of the ring member 44.

Secured to the rear end of the housing 24 is an outer element or strap 58 which overlies the grooved wheel 36 in spaced relation thereto. The forward ends of the strap are provided with inturned portions 60 which engage the outer surface of the housing forwardly of the grooved wheel 36 and are secured thereto in any suitable manner such as by the bolts 62. On the axis of the shaft 26 the strap 58 is provided with an inwardly projecting boss or stud 64. The inner end of a relatively heavy coiled spring 68 is secured to the stud as shown in Fig. 3. The outer end of the coiled spring is secured to one of the bolts 45 which is purposely made longer for this purpose as shown in Figs. 2 and 3. Since the bolt 45 to which the spring is attached forms part of the ring member 44 the latter is constrained by the spring to rotate in the unwinding direction of the spring. The strap lies close to the portions of the cable 42 lying in the groove 40 and provides a safety means for preventing the cable from jumping the groove 40. For clarity the strap 58 in Fig. 3 is shown 90° from its preferred position which is that shown in Fig. 2.

Means is provided limiting rotation of the grooved wheel 36 in the direction urged by the spring 68. This may be accomplished by providing on the rear end of the housing a segmental projection 70 shown in Figs. 3 and 5 and providing on the inner face of the flange 38 of the grooved wheel an inwardly projecting lug 72 which is arranged in overlapping relation to the projection 70 and abuts either one end or the other end of the flange when the wheel is rotated. The spring serves as the medium for returning the rotatable parts of the starter to the initial operating position. The cable sections 16 and 42 exert a rotative force when pulled which is opposite to that of the spring and rotates the wheel against the yielding resistance of the spring.

The overlapping relation of the projection 70 and the lug 72 limits the rotation of the wheel 36 to a little less than one complete turn. In the initial operating position of the parts as urged by the spring, the lug substantially abuts one end of the projection 70 and when the cable is pulled completely back, the lug is rotated until it abuts the opposite end of the projection. In the illustrated embodiment of the invention, the coiled spring is mounted between the stud 64 and the elongated bolt 45 so as to rotate the wheel 36 in a clock-wise direction. Pull exerted on the flexible cable imparts a counter clock-wise rotation to the wheel.

Figures 5, 6, 7, 8, 9:
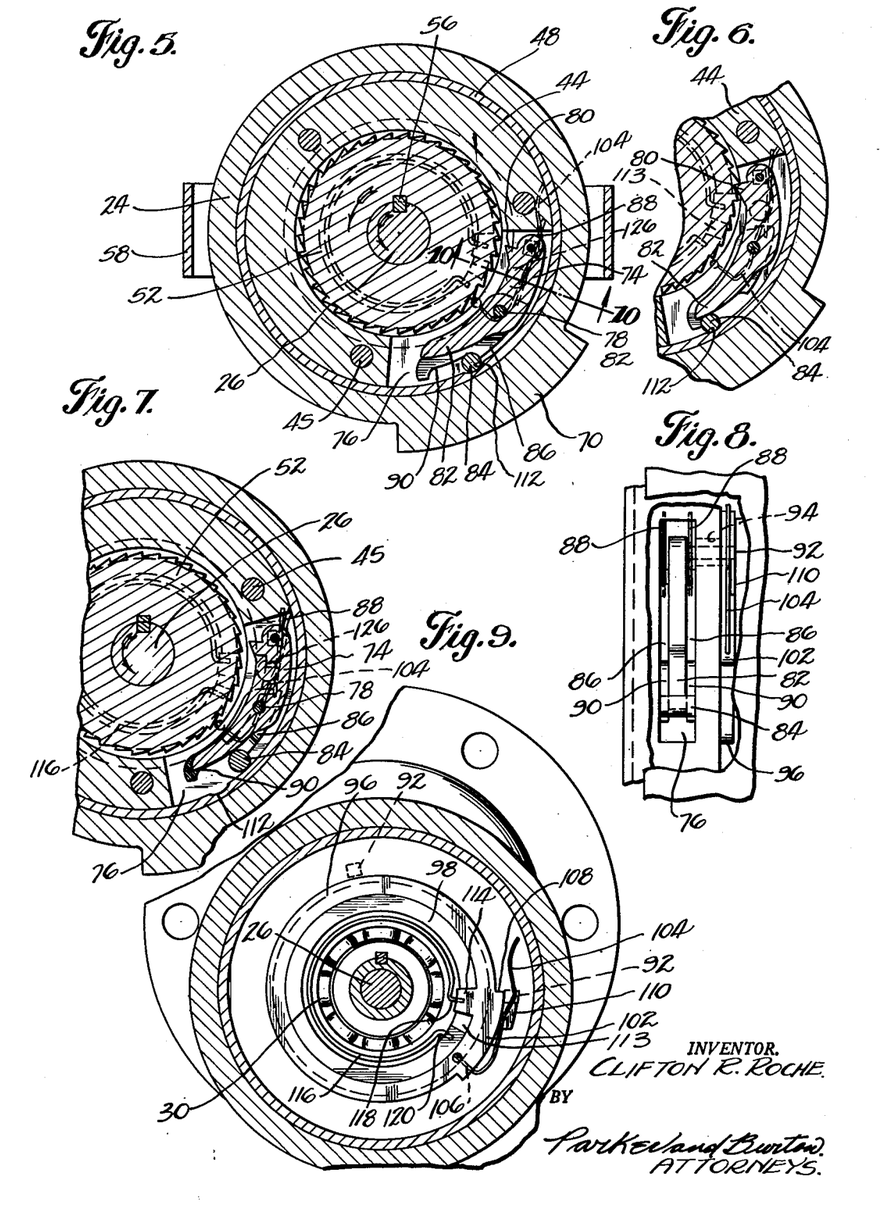
Figure 5 is a cross-sectional view of the starter mechanism along line 5—5 of Fig. 3 showing the parts in initial operating position.
Figure 6 is a fragmentary sectional view of the starter showing the parts in initial engine engaging position.
Figure 7 is a cross sectional view of the starter mechanism similar to Fig. 5 showing the parts in disengaged position just prior to their return to initial starting position.
Figure 8 is a side view of the pawl assembly and associated parts of the starter mechanism.
Figure 9 is a cross-sectional view of the starter mechanism along line 9—9 of Fig. 3.

The ring member 44 carries a pawl 74 which is mounted for movement thereon and in one position engages the ratchet wheel 52 and in another position is disengaged therefrom. Novel means is provided for controlling the movement of the pawl in accordance with the operating conditions of the engine to which the starter is coupled. The pawl is mounted in a recess or slot 76 opening out of the outer and inner peripheries of the ring member 44 in the plane of the ratchet wheel. This slot in the embodiment of the invention illustrated herein is of less width than the thickness of the ring and is located intermediate the front and back sides thereof. As shown in Figs. 5 and 7 the slot extends longitudinally a distance approximately one fourth of the circular dimension of the ring or slightly greater than the length of the pawl 74. The pawl is mounted in the slot for rocking movement about an axis approximately mid-way between the ends of the slot and parallel to the axis of the shaft 26. A pin 78 serves as a means for providing a rocking movement of the pawl. It extends across the slot 76 through the pawl as shown in Fig. 3 and the opposite ends of the pin are received in aligned passages provided in the portions of the ring member on either side of the slot.

One end 80 of the pawl 74 is shaped for engagement with the ratchet wheel 52 and is shown so engaged in Fig. 6. In this position it is obvious that if the ring member 44 is rotated in a counter clock-wise direction this movement will be transmitted by the pawl to the ratchet wheel and joint rotation of the two elements will be effected. However, after the engine is started, the ratchet wheel will overrun the ring member and the pawl will be lifted out of the teeth of the ratchet wheel disengaging the two elements from one another. Bearing against the opposite end section 82 of the pawl from the ratchet engaging end 80 is a cylindrical roller 84 shown in Figs. 5 to 8 inclusive. This roller as will be described more particularly hereafter is capable of a limited travel relative to the pawl along the outer edge of the end section 82 thereof from the position shown in Fig. 6 to the position shown in Fig. 7.

The pawl 74 has a thickness less than the width of the slot 76 and is centrally located therein so that clearance is provided between each side of the pawl and the side walls of the slot. Disposed in these clearances are two similarly shaped roller retaining members or fingers 86—86 shown best in Figs. 3, 5 and 8. These fingers lie flat against the opposite sides of the end section 82 of the pawl and extend beyond the pivot pin 78 toward the operating end 80 of the pawl but, as shown in Fig. 8 terminate short of this end of the pawl. The pivot pin extends through the two fingers 86—86 as well as the pawl and provides rocking movement of the two fingers as it does the pawl. Each finger carries a forwardly projecting rod-like element or wire 88 of inherent resilience which parallels the side of the balance of the pawl and is received in the end wall of the slot adjacent to the operating end 80 of the pawl. These rods flex under the movement of the fingers and normally tend to hold the roller engaging portions of the fingers in the outermost position of their rocking movement as illustrated in Fig. 5.

Each finger member 86 is shaped alongside of the end section 82 of the pawl with a recess 90 on its outer edge to receive the roller 84 and extends in the present embodiment of the invention for a distance approximating three times the diameter of the roller 84. The opposite ends of these recesses are preferably curved outwardly with a radius of curvature corresponding to that of the roller and form stops therefor limiting the travel of the roller to the two extreme positions illustrated in Figs. 5 and 6.

The outer edge of the end section 82 of the pawl is curved to form an angular relation to the curvature of the inner peripherical face of the sleeve 48. When the roller 84 is at its greatest distance from the pivot pin 78 regardless of its position on the inner periphery of the sleeve 48, such as illustrated in Fig. 6, the pawl is capable of being rocked into engagement with the ratchet wheel. As the roller advances toward the pivot pin 78 relative to the pawl it is confined by the sleeve 48 and as it approaches the pin wedges between the pawl and the inner peripheral face of the sleeve 48 and rocks the pawl out of engagement with the ratchet wheel. Such a condition is illustrated in Fig. 7 where the roller has travelled its greatest distance toward the pin 78 and is limited from further travel in that direction by the inner ends of the recesses 90—90 of the finger members.

In the initial operating position of the parts, novel means is provided for holding the pawl out of engagement with the ratchet wheel. This means comprises a pin 92, preferably of squared cross section, carried on the ratchet engaging end of the pawl and extends laterally through a widened opening 94 in the portion of the ring member 44 alongside of the pawl, forming the inside wall of the slot 76, as shown in Fig. 8, and projects beyond this wall portion to overlie the outer edge of an annular member or ring 96. The latter is shown in Figs. 3 and 9 as rotatably supported on a circular shoulder 98 formed on the end of the housing portion 100 upon which the outer race of the ball bearing assembly 30 is mounted. For a short angular distance of its perimeter, the ring 96 is provided with an arcuate platform or elevation 102. Superimposing this elevation is a narrow rod-like element or wire member 104 of inherent resilience, one end 106 of which is bent to extend into the elevation for securement thereto. The resilient wire member 104 overlies the major portion of the outer edge of the elevation 102 within the plane of the ring 96, and the free end section thereof projects beyond the end 108 of the elevation. The squared pin 92, when the pawl is in fully disengaged position, is at a sufficient elevation to be over the end 108 of the elevation 102 and under the wire member 104. Alongside the wire member and back from the end 108 of the elevation is a raised portion or projection 110 which serves as a stop for the pin, limiting further travel thereof over the elevation 102. This projection forms an integral part of the ring 96 and rises from one side of the elevation 102 offset to the wire member 104.

Two positions of the squared pin 92 are illustrated in Fig. 9. In one position the pin is shown in dotted outline near the peripheral edge of the ring 96 remote from the elevation 102 and in this position the pawl would be in engagement with the ratchet wheel. In the other position the pin 92 is shown in dotted outline as supported on the elevation 102 in abutment with the projection 110 thereof. In the initial starting position of the starter mechanism, the pin is disposed in the last mentioned position on the elevation and under the wire member 104. The latter is bent as shown to exert a yielding pressure upon the pin, urging it radially inwardly. When rotative movement is applied to the ring member 44 in the engine starting direction, the pin leaves the end 108 of the elevation and is pressed radially inwardly by the spring wire member 104 to move the pawl into engagement with the ratchet wheel. From this point, as further rotation of the ring member 44 occurs, the pawl now in engagement will exert force upon the ratchet wheel to rotate the same and crank the engine. The spring wire 104 is shown in its normal non-tensioned position in Fig. 9. It is understood that when the squared pin 92 overlies the elevation 102 in abutment with the stop 110 that the wire will spring outwardly to accommodate the pin thereunder and assume the dotted position shown in Fig. 5 where it exerts a yielding pressure on the pin.

Associated with the pawl assembly and cooperating with the functioning thereof is a recess or groove 112 formed on the inner peripheral face of the sleeve 48 which is of a size to receive the roller 84 when the pawl assembly is shifted to a position for the roller to enter therein. In Figs. 5 and 6 the roller is shown as received in the groove 112. In Fig. 7 the roller is out of the groove. The roller retaining fingers 86—86 are spring urged by the resilient wires 88—88 to maintain the roller in contact with the inner surface of the sleeve 48 throughout its travel. The roller is thus mounted between a movable surface, the bases of the recesses 90 of the fingers, and fixed inner face of the sleeve 48 and is constrained to roll along the recesses 90—90 depending on the direction of travel of the pawl assembly.

In the initial starting position as shown in Fig. 5, the roller 84 has dropped into the groove and abuts the inner ends of the recesses 90—90 of the finger members 86—86. The engaging end 80 of the pawl has been elevated out of engagement with the ratchet wheel and the squared pin 92 is seated on the elevation 102 immediately adjacent the end 108 thereof. The opposite end section 82 of the pawl has been rocked radially inward as a result of this action and there is a clearance between this portion of the pawl and the roller as shown in Fig. 5. The groove 112 is so located with respect to the squared pin 92 that when the latter is just over the end 108 of the elevation 102, the roller 84 may drop into the groove and allow full movement of the pawl. This novel arrangement allows the pawl to engage with a snap action as soon as the squared pin reaches the end 108 of the elevation and is forced radially inward by the wire member 104. The groove 112 thus assures a full engagement of the pawl when the latter is first rotated in engine cranking direction and prevents a partial engagement of the pawl tooth 80 with the ratchet wheel which may break the ends of the teeth. In Fig. 6 the pawl assembly has been rotated in engine cranking direction just beyond the point where the pawl engages the ratchet wheel. The rear end section 82 thereof has now been rocked outwardly and bears against the roller 84 along with the roller retaining fingers 86—86. The roller 84 is still in the groove 112 but will be lifted out of the recess upon further rotation of the pawl assembly and carried therealong by the outer end walls of the recesses 90—90 of the finger members.

The ring 96 around which the squared pin of the pawl travels, is capable of a limited rotative movement about its axis for the purpose described hereinafter. As shown in Fig. 9, the shoulder 98 of the housing upon which the ring is mounted is broken away at one point to form a radial opening or recess 113. Forming an integral part of the ring 96 and extending radially inwardly through the opening is a projection 114. The projection has a circumferential dimension less than the recess 113 and thereby provides a limited rotative movement of the ring on the shoulder. The side walls of the opening 113 function as stops, limiting the travel of the projection 114 and the rotative movement of the ring. Encircling the hub portion of the ratchet wheel in the plane of the ring 96, but under the shoulder 98, is a resilient substantially circular wire ring 116. One end 118 of the ring is bent outwardly and is fixed to the projection 114. The other end 120 is similarly bent outwardly and is fixed to the shoulder adjacent to one side wall of the opening 113. The ring 96 is under tension and normally urges the projection 114 away from its fixed end 120 into abutment with the remote side wall of the opening. However, the wire ring will yield to forces tending to turn the ring 96 clockwise as viewed in Fig. 9 and permit the ring to rotate the limited distance of the balance of the opening.

To releasably hold the pawl in any position to which it is rocked it is desirable to provide means which exerts a frictional resistance upon the side of the pawl 74 for this purpose. Referring to Fig. 10, in the area forward of the roller-retaining fingers 86—86 below the spring wire elements 88—88, there is provided a coiled spring 122 which is seated in a recess 124 formed in one side wall of the slot 76 in the ring member 44. One end of the spring yieldingly presses against the adjacent side of the panel and tends to thrust the pawl toward the opposite side of the slot. In the opposite side wall of the slot a protuberance in the form of a headed member 126 is provided which contactually bears against the side of the pawl opposite to the spring. The shank portion of the member 126 may be removably slidably received in a passage drilled in the portion of the ring member 44 forming the side wall of the slot and mounted therein with the head in the slot in position to abut the side of the pawl as shown in Fig. 10. Thus the pawl is frictionally held in whatever position it is rocked by the opposing action of the spring and the headed member 126.

As previously described, the manual control system for operating the starter mechanism comprises a cable 16 leading from the cockpit or other convenient part of the craft in which the starter is mounted to a force multiplying means generally indicated at 20. A second cable section 42 leads from the device 20 to the grooved wheel 36 of the starter and in initial operating position is partially wound thereon. The two cable sections 16 and 42 might be one length of cable as will be described hereinafter but for purpose of clarity they are considered and illustrated as two separate lengths of cable.

Figure 12:
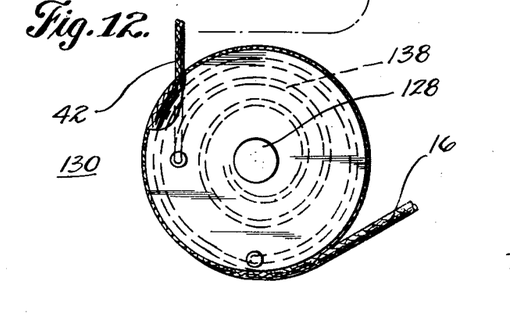
Figure 12 is an end view of the force-multiplying means illustrated in Fig. 11.

Referring to Figs. 11 and 12, there is mounted on a transverse shaft 128 which may be disposed below and in alignment with wheel 36 of the starter mechanism a freely rotatable body generally indicated at 130. This body is divided longitudinally into a larger diameter portion 132 having a circular peripheral groove 134 therein and a smaller conical portion 136 having a spiral peripheral groove 138 therein. The cable section 16 is passed around the groove of the larger portion 132 preferably two turns as shown in Figs. 11 and 12. The end of the cable 16 on the body portion 132 is fixed thereto in any suitable way such as by passing the end thereof through a hole in the side of the body portion and knotting or otherwise securing the end over a retaining member 140 which is brought up into abutment with the side of the body portion 132. The end of the cable section 42 is similarly secured to the smaller body portion 136 at the end of the spiral groove thereof having the larger diameter. In the initial operating position of the parts the cable section 42 is not wound in the spiral groove but leads from the end of the larger diameter thereof directly to the wheel 36 of the starter mechanism.

It is evident that when the cable section 16 is pulled it will rotate the body 130 as it unwinds therefrom. At the same time the cable section 42 will wind on the conical portion 136 of the body lying first in the greatest radial dimensions of the groove and progressively lesser radial dimensions of the groove as the body continues to rotate. By this arrangement the pull exerted by the operator is progressively multiplied as the handle 18 of the cable 16 is pulled back. This is highly desirable as the maximum compression of the engine is not reached until after the crank shaft has partially turned on its axis. As previously mentioned, the cable sections 16 and 42 may form one single length of cable. The single length of cable would be clamped to the body 130 at the two points where the ends of the cable sections 16 and 42 are secured thereto and extend between these two points of securement. The same result would take place when the single cable was pulled as when the two separate cable sections are employed.

In the initial operating position of the parts of the starter mechanism, the squared pin 92 of the pawl is supported, as previously mentioned, on the elevation 102 and the end 80 of the pawl is out of engagement with the ratchet wheel. The ring member 44 and the grooved wheel 36 to which it is fixed have been rotated in clockwise direction, as viewed in Fig. 5, and the lug 72 of the latter is a short distance from the segmental stop 70 of the housing. The roller is disposed at the inner end of the pawl section 82 and has dropped into the groove or cavity 112 which normally would allow the pawl to rock into engagement with the ratchet wheel except for the fact that the pin 92 is retained on the elevation 102. When the cable is first pulled, the initial rotative movement of the ring member 44 carries the squared pin off of the end 108 of the elevation, at which time the spring wire rod 104 presses the pin and pawl radially inwardly and effects engagement of the pawl with the teeth of the ratchet wheel as shown in Fig. 6. The ring member 44 and the ratchet wheel are thus coupled together, and further pull of the cable commences to turn over the engine. During the movement of the parts before the engine becomes self-operable, the pawl is carried by the ring member 44 around the axis of the shaft 26, and the fingers 86—86 of the pawl assembly carry the roller 84 therewith. During this movement the roller is carried at the outer end of the section 82 of the pawl and rolls along the inner periphery of the fixed sleeve 48.

As soon as the engine is started the shaft 26 and the ratchet wheel 52 commence to overrun the ring member 44 and, as previously described, the teeth of the ratchet wheel lift the pawl out of engagement therewith, the spring brake 122—126 acting to hold the pawl from return movement. If the pulling force on the cable is relaxed, the coiled spring 68 commences to return the grooved wheel 36 and the ring member 44 to initial starting position. The pawl is carried along with the ring member 44 as the latter returns in a clockwise direction to its initial starting position. Since the roller 84 rolls on a fixed surface, the inner face of the sleeve 48, it will travel toward the pivotal axis of the pawl as the latter commences its return movement. This relative movement of the roller will further rock the engaging end 80 of the pawl away from the ratchet wheel until the pawl assumes the position shown in Fig. 7. In this position, the squared pin has been shifted radially outwardly sufficiently far to clear or ride over the elevation 102, and as the parts come to rest in their initial starting position the pin will advance over the end 108 of the elevation into abutment with the stop 110 thereof. The spring wire rod 104 will yield to the return movement of the pin but continues to exert pressure thereon.

If in the course of starting the engine, the engine should reverse its rotation such as by backfiring or by the application of forces on the propeller tending to rotate it in the direction contrary to its normal direction of rotation, the ratchet wheel 52 will be rotated in the direction opposite to the arrows in Fig. 5 and by virtue of the engagement of the pawl 74 therewith carry the pawl and ring member 44 in the same direction. Immediately as soon as this occurs the roller 84 will travel toward the pivoting axis of the pawl as the latter shifts back and rock the pawl out of engagement with the ratchet wheel. This will free the control of the starter from the engine and except for a momentary check on the cable the operator in the cockpit will feel no strain on the cable nor is the cable pulled back to its original position.

If the reverse rotation of the engine should occur just as the squared pin 92 leaves the end 108 of the elevation 102 upon which it rests at the commencement of the starting operation, the pin would be damaged or sheared off except for the novel provision previously described which allows the ring 96 to rotate a limited distance on the shoulder 98. In that event, the reverse rotation of the pin will cause it to abut the end 108 of the elevation and carry the ring 96 with it against the resistance of the spring wire member 116. During the joint movement of the ring 96 and the pawl assembly within the limited distance provided by the recess 112, the roller will travel to a wedging position along the section 82 of the pawl toward the pivoting axis thereof and as it is forced out the back side of the recess 112 will withdraw the engaged end 80 of the pawl out of the teeth of the ratchet wheel thereby disconnecting the two from one another and freeing the starter mechanism from the engine.

Although the embodiment of the invention illustrated herein is applied to the starting of aircraft engines, it is understood the invention is readily applicable to the starting of engines in other types of craft.

What I claim is:

1. A starter mechanism for engines comprising, in combination, concentrically mounted drive and driven members, means for operatively coupling the driven member to an engine, means for rotating said drive member, a pawl carried by one of said members and movable into engagement with the other member to couple the two together for joint rotation, means operable to move said pawl to engaging position when the drive member is rotated in one direction, an element movable along a surface portion of said pawl and operable as it advances from one position to another along said surface portion to move the pawl out of engagement, and means engaging said element and acting to advance the element along said surface portion of the pawl to the position where it moves the pawl out of engagement when the drive member is rotated in the opposite direction.

2. A starter mechanism for engines comprising, in combination, concentrically mounted drive and driven members, means for operatively coupling the driven member with an engine, manual operable means for rotating said drive member in one direction, means for returning said drive member to initial operating position following rotation by said manual operable means, ratchet gear teeth carried by one of said members, a pawl carried by the other of said members and mounted thereon for movement into and out of engagement with said ratchet gear teeth, an element associated with said pawl and bearing against a surface portion thereof, means causing said element to move with the pawl as the latter rotates with the member with which it is associated but providing limited travel of the element relative to the pawl along a surface portion thereof, said element at one end of its travel along said surface portion of the pawl permitting the latter to engage with said ratchet gear teeth but operable as it advances toward the other end to retract the pawl out of engagement therewith, and a peripheral surface adjacent to the path of movement of said pawl and acting on said element to cause the element to travel in the direction to retract the pawl out of engagement with the ratchet gear teeth when the drive member commences to return toward initial operating position.

3. A starter mechanism for engines comprising, in combination, a drive member, a driven member concentric to said drive member and operatively coupled to an engine, manually operable means for rotating said drive member in one direction, means for automatically returning said drive member to initial operating position following rotation by said manually operable means, ratchet gear teeth carried by said driven member, a pawl carried by said drive member and mounted thereon for pivotal movement into and out of engagement with said teeth, means operable to move said pawl into engagement with said teeth when the drive member is rotated by said manually operable means, a fixed peripheral surface adjacent to the path of movement of the pawl, a roller member contactually bearing against said peripheral surface and against a surface portion of the pawl, means for causing said roller to travel with said pawl as the latter rotates with the drive member in continuous contactual engagement with said surfaces but providing limited relative movement of the roller along the surface portion of the pawl while traveling therewith, said roller adjacent to one end of its limited relative movement along said surface portion permitting the pawl to pivot into engagement with said teeth but operable as it advances toward the other end of its limited relative movement to retract the pawl out of engagement with said teeth, said roller mounted with respect to the drive member to move toward said first end when the drive member is rotated by said manual means and toward said second end when rotated in the opposite direction by said automatic returning means.

4. A starter mechanism for engines comprising, in combination, a rotatable drive member, a rotatable driven member concentrically mounted with respect to the drive member and operatively coupled with an engine, manually operable means for rotating said drive member in one direction, means for automatically returning said drive member to initial starting position following rotation by said manually operable means, a ratchet wheel carried by said driven member, a pawl, means rockingly securing said pawl to said drive member about an axis paralleling the axis of said members and providing movement of one end thereof into and out of engagement with said ratchet wheel, means operable to move said end of the pawl into engagement with the ratchet wheel when the drive member is rotated by said manually operable means, a fixed sleeve concentrically mounted with respect to said members and having a peripheral surface portion thereof adjacent to the path of travel of said pawl, a roller member contactually bearing against said peripheral surface portion of the sleeve and against a surface portion of said pawl adjacent to other other end thereof, and means for causing said roller to travel with said pawl in continuous contactual engagement with said peripheral surface portions but providing limited relative movement of the roller along said surface portion of the pawl, said pawl adapted in one position of its limited movement relative to the surface portion of the pawl to allow the pawl to rock into engagement with said ratchet wheel and adapted as it advances toward a second position along the surface portion of the pawl to wedge the pawl out of engagement with the ratchet wheel.

5. A starter mechanism for engines comprising, in combination, a rotatable drive member, a rotatable driven member concentrically mounted with respect to the drive member and operatively coupled with an engine, manually operable means for rotating said drive member in one direction, means for automatically returning said drive member to initial starting position following rotation by said manually operable means, a ratchet wheel carried by said driven member, a pawl, means rockingly securing said pawl to said drive member about an axis parallelnig the axis of said members and providing movement of one end thereof into and out of engagement with said ratchet wheel, means operable to move said end of the pawl into engagement with the ratchet wheel when the drive member is rotated by said manually operable means, a fixed sleeve concentrically mounted with respect to said members and having a peripheral surface portion thereof adjacent to the path of travel of said pawl, a roller member contactually bearing against said peripheral surface portion of the sleeve and against a surface portion of said pawl adjacent to the other end thereof, and means for causing said roller to travel with said pawl in continuous contactual engagement with said peripheral surface portions but providing limited relative movement of the roller along said surface portion of the pawl, said roller adapted in one position of its limited movement relative to the surface portion of the pawl to allow the pawl to rock into engagement with said ratchet wheel and adapted as it advances toward a second position along the surface portion of the pawl to wedge the pawl out of engagement with the ratchet wheel, said roller so related to the rocking axis of the pawl and said peripheral surface portion of the sleeve that when the drive member is rotated by said manual means the roller assumes said first position along said surface of the pawl and when the drive member is returned by said automatic means the roller advances toward and assumes said second position along the surface portion of the pawl, and means at the initial starting position of said drive member for releasably holding said pawl out of engagement with said ratchet wheel regardless of the position of said roller.

6. A starter mechanism including, in combination, a rotatable member, a pawl carried by said member and pivoted intermediate its ends for rocking movement about an axis parallel to the axis of rotation of said member, a fixed circular member having a peripheral surface portion adjacent to the path of travel of said pawl, a roller interposed between said peripheral surface portion of said fixed member and a surface portion associated with said pawl on one side of its pivotal axis, roller retaining means associated with said pawl and carrying the roller therewith along its path of travel, said roller-retaining means yieldingly urging said roller into continuous contactual engagement with said peripheral surface portion of said fixed member and at the same time providing limited movement of the roller relative to said surface portion of the pawl.

7. A starter mechanism including, in combination, a rotatable ratchet wheel, a rotatable drive member concentrically mounted with respect to said ratchet wheel and encircling the same, a fixed annular shaped member concentrically mounted with respect to the drive member and encircling the same, a pawl carried by said drive member and pivotally supported thereon for rocking movement about an axis intermediate its ends and parallel to the axis of the drive member, said pawl having one end thereof adapted to rock into and out of engagement with said ratchet wheel and the other end section thereof bearing an angular relation to the inner peripheral surface of said annular member, a roller interposed between the inner peripheral surface of the annular member and said end section of the pawl, a roller-retaining finger carried by said drive member and spring urged to press said roller into continuous contactual engagement with the inner peripheral surface of the annular member, said finger carrying said roller with the pawl along its path of travel but providing limited movement thereof toward and away from the pivotal axis, said roller adapted in positions remote from said pivotal axis to allow the pawl to rock into engagement with the ratchet wheel but as it advances toward the pivotal axis to engage said end section of the pawl and wedge the latter away from the inner peripheral surface of the annular member and disengage the pawl from the ratchet wheel, means adjacent to the initial starting position of said drive member for releasably holding said pawl out of engagement with the ratchet wheel, and means for providing a snap engagement of the pawl with the ratchet wheel immediately following movement of the drive member from its initial starting position.

8. A starter mechanism for engines comprising, in combination, a drive member, a driven member co-axially mounted with respect to said drive member and adapted to be operatively coupled to an engine, means for rotating said drive member in one direction from an initial operating position, means for automatically returning said drive member to its initial operating position, ratchet gear teeth carried by one of said members, a pawl carried by said other member and mounted thereon for pivotal movement into and out of engagement with said teeth, means operable to move said pawl into engagement with said teeth to couple the two members together for joint rotation when the drive member is rotated in said direction by said rotating means, a fixed peripheral surface adjacent to the path of movement of said pawl, said pawl having a surface associated therewith to form an angle with said fixed peripheral surface, a round member engageable with both of said surfaces and movable to wedge therebetween and force the pawl out of engagement with said teeth when the driven member is rotated reverse to said direction in which the drive member is rotated by said rotating means.

9. A starter mechanism for engines comprising, in combination, a drive member, a driven member co-axially related to said drive member and adapted to be operatively coupled to an engine, means for rotating said drive member in one direction, means for automatically returning said drive member to initial starting position following rotation by said first means, ratchet gear teeth carried by one of said members, a pawl carried by the other of said members and mounted thereon for pivotal movement into and out of engagement with said ratchet gear teeth, a roller associated with said pawl, means for causing the roller to travel with said pawl as the latter rotates with the member upon which it is carried but providing limited movement of the roller relative to the pawl, said roller adjacent to one end of its limited movement relative to the pawl permitting the pawl to pivot into engagement with said ratchet gear teeth to couple the drive and driven members together but operable as it advances toward the other end of its limited relative movement to retract the pawl out of engagement with the ratchet gear teeth.

10. A starter mechanism including, in combination, a rotatable member, a pawl carried by said member and pivoted for rocking movement about an axis substantially parallel but off-set to the axis of rotation of the member, a fixed circular member having a peripheral surface portion adjacent to the path of travel of said pawl as it revolves with said rotating member, a roller interposed between said peripheral surface portion of said fixed member and said pawl, roller retaining means associated with said pawl and carrying the roller therewith as it revolves with said rotating member, said roller retaining means holding said roller in continuous contactual engagement with the peripheral surface portion of said fixed member and providing limited movement of the roller relative to the pawl, and said peripheral surface portion provided with a recess into which said roller may releasably seat at one position of the pawl in its rotary path of travel.

11. A starter mechanism for engines comprising, in combination, co-axially mounted rotatable drive and driven members, means for rotating said drive member in one direction from an initial operating position, ratchet gear teeth carried by one of said members, a pawl carried by the other member and mounted thereon for substantially radial movement into and out of engagement with said ratchet gear teeth, means holding said pawl out of engagement with said ratchet gear teeth for a predetermined angular movement of the drive member from said initial operating position, and spring means yieldingly urging said pawl in a radial direction for engagement with said ratchet gear teeth, said spring means operable immediately after said predetermined angular movement of the drive member for quickly moving said pawl into engagement with said ratchet gear teeth.

12. In an engine starting device, co-axially mounted rotatable drive and driven members, means for coupling the driven member to the engine to effect the starting operation thereof, means for rotating said drive member in one direction from an initial operating position, ratchet gear teeth carried by one of said members, a pawl carried by the other of said members and mounted thereon for radial movement into and out of engagement with said teeth, means for releasably holding said pawl out of engagement with said teeth when the drive member is in its initial operating position, said means constituting a relatively fixed platform substantially peripherally related to the axis of rotation of said members and terminating abruptly in a substantially radially extending end face, and means for providing snap engagement of the pawl with said teeth immediately following movement of the drive member from its initial operating position by said rotating means, said last means constituting a spring acting on said pawl in a direction to urge it radially into engagement with said teeth and operable as soon as the pawl leaves the abrupt end of the platform to move the pawl radially into engagement with the teeth.

13. In an engine starting mechanism, co-axially mounted rotatable drive and driven members, ratchet gear teeth carried by one of said members, a pawl carried by the other of said members and pivoted for rocking movement about an axis substantially parallel to the axis of rotation of the members, a relatively fixed peripheral surface portion adjacent to the path of travel of said pawl as it revolves with the member upon which it is carried, a roller interposed between the pawl and said peripheral surface portion, and roller retaining means associated with said pawl and carrying the roller therewith as it revolves with said rotating member but providing limited movement of the roller relative to the pawl, said roller cooperating with said peripheral surface portion and operable in one position of its limited movement relative to the pawl to wedgingly hold the latter out of engagement with said teeth.

14. In an engine starting device, co-axially mounted rotatable drive and driven members, means for coupling the driven member to an engine to effect the starting operation thereof, means for rotating said drive member in one direction from an initial operating position, ratchet gear teeth carried by one of said members, a pawl pivotally mounted on the other of said members and bodily movable therewith as it rotates and capable of rocking movement into and out of engagement with said ratchet gear teeth, a ring-shaped member co-axially mounted with respect to the drive and driven members and having a limited angular movement about the axis of rotation of said members, a peripheral shoulder on the ring-shaped member having at one end a radial projection serving as a stop and terminating at the other end in a radial drop-off, said ends of the shoulder so angularly related to the direction of rotation of the drive member that the drop-off end is disposed forwardly of the projection, an element carried by the pawl and adapted to bear on said shoulder and abut said drop-off in the initial operating position of the drive member, said element when thus bearing on the shoulder acting to hold the pawl out of engagement with said teeth, spring means yieldingly urging the pawl into engagement with said teeth and operating to snap the pawl into engagement therewith as soon as the element leaves the drop-off end of the shoulder, and spring means yieldingly urging the ring-shaped member in the direction of rotation of the drive member.

15. In an engine starting device, co-axially mounted rotatable drive and driven members, means for coupling the driven member to an engine to effect the starting operation thereof, means for rotating said drive member in one direction from an initial starting position, ratchet gear teeth carried by one of said members, a pawl pivotally mounted on the other of said members and bodily movable therewith and capable of rocking movement about its pivotal axis into and out of engagement with said teeth, a relatively fixed member disposed adjacent to the path of bodily movement of the pawl, a peripheral shoulder on the last mentioned member terminating in a radial drop-off at one end thereof, an element carried by the pawl and adapted to bear on said shoulder in the initial operating position of the drive member, said element when thus bearing on the shoulder acting to hold the pawl out of engagement with said teeth, and spring means yieldingly urging the pawl into engagement with said teeth and operable to snap the pawl into engagement therewith as soon as the element leaves the drop-off end of the shoulder.

CLIFTON R. ROCHE.

REFERENCES CITED

The following references are of record in the file of this patent:

UNITED STATES PATENTS

| Number | Name | Date |
|---|---|---|
| 416,331 | Githens | Dec. 3, 1889 |
| 934,576 | Seyler | Sept. 21, 1909 |
| 1,090,637 | Lynnock | Mar. 17, 1914 |
| 1,189,067 | Davenport | June 27, 1916 |
| 2,323,535 | Gorden | July 6, 1943 |